United States Patent [19]

Toukairin et al.

[11] Patent Number: 5,624,765
[45] Date of Patent: Apr. 29, 1997

[54] ADHESIVE COMPOSITIONS FOR ADHERING RUBBER AND FIBER, RUBBER-REINFORCING SYNTHETIC FIBERS, AND FIBER-REINFORCED RUBBER STRUCTURES

[75] Inventors: Hiromitu Toukairin; Takayuki Sasaki; Yasumi Kanda, all of Aichi, Japan

[73] Assignee: Toray Industries, Inc., Japan

[21] Appl. No.: 509,169

[22] Filed: Jul. 31, 1995

[30] Foreign Application Priority Data

| Aug. 1, 1994 | [JP] | Japan | 6-179853 |
| Aug. 1, 1994 | [JP] | Japan | 6-179854 |
| Aug. 1, 1994 | [JP] | Japan | 6-179855 |
| Apr. 25, 1995 | [JP] | Japan | 7-101322 |

[51] Int. Cl.$^6$ ............................. B32B 25/02; C08K 3/34
[52] U.S. Cl. ............... 428/492; 428/494; 428/460; 524/492
[58] Field of Search ............................. 428/492, 494, 428/460, 505; 524/492

[56] References Cited

U.S. PATENT DOCUMENTS

| 3,660,202 | 5/1972 | Edington et al. | 156/335 |
| 3,935,124 | 1/1976 | Thene et al. | 252/382 |
| 4,292,111 | 9/1981 | Bezwada | 428/460 X |
| 4,944,821 | 7/1990 | Nishikawa et al. | 156/161 |
| 5,321,070 | 6/1994 | Meier et al. | 524/493 |

FOREIGN PATENT DOCUMENTS

| 71011251B | 9/1966 | Japan . |
| 60-042226B | 9/1985 | Japan . |
| 61-126142A | 6/1986 | Japan . |
| 63-175179A | 7/1988 | Japan . |
| 01174628A | 11/1989 | Japan . |
| 03040875A | 2/1991 | Japan . |

*Primary Examiner*—Daniel Zirker
*Attorney, Agent, or Firm*—Austin R. Miller

[57] ABSTRACT

Adhesive composition for adhering rubber and fiber which make synthetic fibers highly adhesive to rubber even when a reduced amount of the composition is applied to the fibers; rubber-reinforcing synthetic fibers coated with the adhesive composition to have improved adhesiveness to rubber while retaining the intrinsic characteristics of the synthetic fibers themselves; and fiber-reinforced rubber structures where the rubber has been reinforced by the rubber-reinforcing synthetic fibers. The adhesive composition contains, adhesive matrix and a silicate compound, the silicate compound comprising silicon and magnesium at a ratio by weight of silicon/magnesium of from 1/0.1 to 1/1.0. Preferably, a 1% aqueous dispersion of the silicate compound has a transmittance of about 50% or more and/or a 2% aqueous dispersion of the silicate compound has a thixotropy index of from about 2.0 to 10.0. The silicate compound is preferably a smectite.

22 Claims, No Drawings

ADHESIVE COMPOSITIONS FOR ADHERING RUBBER AND FIBER, RUBBER-REINFORCING SYNTHETIC FIBERS, AND FIBER-REINFORCED RUBBER STRUCTURES

FIELD OF THE INVENTION

The present invention relates to adhesive compositions for rubber and fiber which improve the adhesiveness between rubber and synthetic fibers, rubber-reinforcing synthetic fibers coated with the adhesive composition thereby having improved adhesiveness to rubber, and fiber-reinforced rubber structures comprising the rubber-reinforcing synthetic fibers coated with the adhesives.

BACKGROUND OF THE INVENTION

Synthetic fibers are commonly used as reinforcing materials for rubber structures such as tires, belts, hoses, etc. The synthetic fibers used include polyester fibers such as polyethylene terephthalate fibers, polyamide fibers such as typically nylon 6 fibers and nylon 66 fibers, aromatic polyamide fibers, polyvinyl alcohol fibers, etc. However, since such synthetic fibers have poor adhesiveness to rubber, various means have heretofore been proposed of improving the adhesiveness of synthetic fibers to rubber by coating the surfaces of synthetic fibers with an adhesive agent comprising an epoxy compound, an isocyanate compound, a halogenated phenol compound or the like.

An example of a typical adhesive agent for polyester fibers is a mixture prepared by mixing a reaction product of a halogenated phenol such as 2,6-bis(2',4'-dihydroxyphenylmethyl)-4-chlorophenol and resorcinol-formaldehyde with a liquid comprising a precondensate of resorcinol-formaldehyde and rubber latex (RFL) (see Japanese Patent Publication No. 46-11251). However, a fairly large amount of this adhesive agent must be applied to polyester fibers, and the fibers must be heat-treated at high temperatures in order to provide sufficient adhesive strength (drawing strength). The fibers treated under such severe conditions exhibit an increased initial adhesive strength (drawing strength) in ordinary temperature conditions, but the adhesion of rubber to the cleaved fiber plies is retarded.

A two-step method of applying adhesive agents to polyester fibers is known, in which polyesters are treated with a first treating liquid comprising a mixture of an epoxy compound, a blocked isocyanate and bentonite and then treated with a second treating liquid comprising RFL and an ethylene-urea compound (for example, see Japanese Patent Publication No. 57-29586). However, this method results in polyester fibers having adhesive strength (drawing strength) with low heat resistance. Additionally, the stability of the first treating liquid is poor since the bentonite in the liquid has a high true specific gravity and a large particle size, and therefore is not viscous and is easily precipitated.

Another method is known in which polyester fibers are treated with a first treating liquid comprising a mixture of an epoxy compound, a blocked isocyanate and a latex, and then treated with a second treating liquid comprising RFL (for example, see Japanese Patent Publication No. 60-24226). The polyester fibers treated by this method have a relatively high initial adhesive strength (drawing strength) and the adhesion of rubber to the cleaved fiber plies is enhanced. However, the treated polyester fiber cords become hard and the mechanical strength of the cords is lowered, whereby not only is the difficulty in shaping and working the cords increased, but also the fatigue resistance of the cords is lowered.

As typical examples of means of improving the adhesiveness of polyamide fibers to rubber, there is known a method for producing ultra-high-strength nylon tire-reinforcing cords which involves dipping tire-reinforcing cords comprising ultra-high-strength nylon 6 or nylon 66 fibers having a single yarn denier of 4.5 d or less and a raw yarn strength of 12 g/d or more, in a liquid comprising a resorcinol-formaldehyde precondensate and a rubber latex, while the cord strength is controlled to be 0.5 g/d or more (see Japanese Patent Laid-Open No. 63-175179), and also a method for producing rubber-reinforcing polyamide fibers by heat-treating twisted cords comprising nylon 66 fibers having a raw yarn strength of 12 g/d or more under tension at particular temperatures, followed by dipping them in a dipping liquid comprising a vinylpyridine-styrene-butadiene copolymer rubber latex where the proportion of vinylpyridine is specifically defined relative to the total weight of the latex, whereby the decrease in the strength of the thus-treated cords is prevented (see Japanese Patent Laid-Open No. 1-174628). However, the rubber-reinforcing polyamide fibers obtained according to these methods have various problems inhibiting their practical use: the fibers require a single yarn denier of 4.5 d or less, dipping steps must be applied to the fibers, the improvement in the adhesiveness of the fibers to rubber is still unsatisfactory, and the use of the treated fiber cords is limited.

One example of known techniques for improving the adhesiveness of aromatic polyamide fibers to rubber involves dipping an aromatic polyamide fiber material in a first treating liquid comprising a polyepoxy compound having a hydroxyl group(s) and an epoxy compound having unsaturated bond(s), followed by a heat treatment and thereafter a treatment with a second treating liquid of a resorcinol-formaldehyde-rubber latex (RFL) (see Japanese Patent Laid-Open No. 61-126142). However, the adhesiveness between rubber and the aromatic polyamide fibers obtained is still inferior to that between nylon fibers or polyester fibers and rubber.

Another known method involves treating aromatic polyamide fibers with a first treating liquid comprising a polyepoxy compound, a blocked isocyanate compound and a rubber latex compound, followed by treatment with a second treating liquid comprising a resorcinol-formaldehyde-rubber latex (RFL) and a particular chlorophenol compound (see Japanese Patent Laid-Open No. 3-40875). The aromatic polyamide fibers obtained by this method exhibit adhesiveness to rubber comparable to the adhesiveness of nylon or polyester fibers to rubber, but the method still requires that large amounts of the adhesive compositions be applied to the fibers in order to attain satisfactory adhesiveness. Therefore, the costs associated with the adhesive compositions are high.

SUMMARY OF THE INVENTION

An object of the present invention is to provide adhesive compositions which make synthetic fibers highly adhesive to rubber even when a reduced amount of the composition is applied to the fibers.

Another object of the present invention is to provide rubber-reinforcing synthetic fibers having improved adhesiveness to rubber, and in particular, improved initial adhesive strength (drawing strength) to rubber and improved adhesiveness to rubber at the cleaved fiber plies, without repressing the intrinsic characteristics of the synthetic fibers themselves.

Yet another object of the present invention is to provide fiber-reinforced rubber structures where the rubber has been reinforced by synthetic fibers having improved adhesiveness to rubber.

The present invention provides adhesive compositions which make synthetic fibers highly adhesive to rubber, characterized in that a silicate compound comprising silicon and magnesium at a weight ratio (Si/Mg) of from about 1/0.1 to 1/1.0 is incorporated into an adhesive matrix component. The silicate compound is characterized in that the transmittance (T) of the 1% aqueous dispersion of the compound is about 50% or more and/or that the thixotropy index of the 2% aqueous dispersion thereof is from about 2.0 to 10.0.

Another aspect of the present invention provides rubber-reinforcing synthetic fibers having improved adhesiveness to rubber characterized in that the surfaces of the synthetic fibers are coated with the above-mentioned adhesive composition.

Yet another aspect of the present invention provides fiber-reinforced rubber structures characterized in that the rubber in the rubber structures are reinforced by rubber-reinforcing synthetic fibers having improved adhesiveness to rubber.

The silicate compound of the adhesive composition comprises silicon and magnesium at a weight ratio (Si/Mg) of from 1/0.1 to 1/1.0 and is characterized in that the transmittance (T) of the 1% aqueous dispersion of the silicate compound is about 50% or more and/or that the thixotropy index of the 2% aqueous dispersion thereof is from about 2.0 to 10.0. The most preferred example of the silicate compound is a synthetic clay smectite.

It is preferable that the adhesive matrix component of the adhesive composition consists essentially of a resorcinol-formaldehyde-rubber latex, or of at least one compound selected from a polyepoxide compound, a blocked polyisocyanate compound, an ethylene-urea compound and rubber latex. In addition, it is preferable that the amount of the silicate compound to be added to the adhesive matrix component is from about 1 to 15% by weight of the adhesive matrix component.

It is also preferable that when the synthetic fibers are polyester fiber cords, the amount of the adhesive composition coating the fiber cords is from about 2.0 to 4.0% by weight relative to the weight of the fibers, the cord hardness is from about 5 to 20 g/cord and the drawing T-adhesive strength of one cord is from about 5.8 to 7.5 g/d; that when the synthetic fibers are polyamide fiber cords, the amount of the adhesive composition coating the fiber cords is from about 2.0 to 5.0% by weight relative to the weight of the fibers, the cord hardness is from about 5 to 20 g/cord and the drawing T-adhesive strength of one cord is from about 5.5 to 7.5 g/d; that when the synthetic fibers are aromatic polyamide fiber cords, the amount of the adhesive composition coating the fiber cords is from about 3.0 to 5.0% by weight relative to the weight of the fibers, the cord hardness is from about 5 to 20 g/cord and the drawing T-adhesive strength of one cord is from about 5.5 to 7.5 g/d; and that when the synthetic fibers are polyvinyl alcohol fiber cords, the amount of the adhesive composition coating the fiber cords is from about 2.0 to 5.0% by weight relative to the weight of the fibers, the cord hardness is from about 5 to 20 g/cord and the drawing T-adhesive strength of one cord is from about 5.5 to 7.5 g/d.

In addition, it is preferable that the synthetic fiber cords have both a primary twist and a final twist, with the twist coefficient for the final twist being from about 900 to 1800 and the twist coefficient for the primary twist being from about 1300 to 2500.

The fiber-reinforced rubber structures of the invention include, for example, tires, belts, hoses, etc.

DETAILED DESCRIPTION OF THE INVENTION

The present invention will now be described in detail, with the adhesive compositions of the invention first being described.

The silicate compound incorporated into the adhesive matrix component to form the adhesive composition of the present invention is an inorganic compound which comprises silicon and magnesium, while optionally containing sodium, lithium, fluorine and/or aluminum. In general, the silicate compound is a synthetic inorganic compound which is referred to as a smectite.

It is preferable that the transmittance (T) of the 1% aqueous dispersion of the silicate compound be about 50% or more, more preferably about 70% or more.

It is also preferable that the thixotropy index of the 2% aqueous dispersion of the silicate compound be from about 2.0 to 10.0, more preferably from about 3.0 to 9.0, and that the specific surface area of the silicate compound is from about 100 to 500 $m^2/g$, more preferably from about 150 to 400 $m^2/g$.

The transmittance (T), the thixotropy index and the specific surface area referred to herein are values obtained according to the methods mentioned below.

Transmittance (T)

A 1% aqueous dispersion of a silicate compound is well stirred and then kept static for one full day. After having confirmed that the dispersion has no precipitate, the dispersion is put in a cell having a length of 10 mm, and the transmittance therethrough at 500 nm is measured with a spectrophotometer (U-3000 Model, produced by Hitachi).

Thixotropy Index (TI)

A 2% aqueous dispersion of a silicate compound is well stirred then kept static for one full day. After having confirmed that the dispersion has no precipitate, the viscosity of the dispersion is measured with a viscometer (B Model, produced by Shibaura System). The rotor used is a No. 3 Rotor. The rotor is rotated for one minute at 6 rpm and 60 rpm but is stopped for 2 minutes just before the measurement.

$TI$=(viscosity at 6 rpm)/(viscosity at 60 rpm)

Specific Surface Area

A specific surface area meter (Quantasorb, produced by Yuasa Ionics), is used. The cell for the device is weighed and then approximately half-filled with the silicate compound to be measured (about 0.15 g). The cell is then weighed and measured with the meter according to a conventional method. The specific surface area of the compound is calculated as follows:

Specific Surface Area $(m^2/g)$=$(A/AC)\times(V\times2.81$/amount of sample (g))

A: the value indicated by the integrating meter after the cell has been taken out of liquid nitrogen and dipped in water at room temperature.

AC: the value indicated by the integrating meter after pure liquid nitrogen gas has been introduced.

V: A/1300.

The silicate compound, especially the synthetic smectite, provides a thixotropic water dispersion having a stable viscosity and an enlarged specific surface area.

Thus, the silicate compound acts as a penetration inhibitor and as a softening agent. Therefore, even when a reduced amount of the adhesive composition is applied to synthetic fibers, not only is the adhesion stability of the fibers to rubber improved, but also the treated fiber cords are softened, and deterioration of cord strength is effectively prevented.

Specifically, since the silicate compound has many hydroxyl groups on its surface, it absorbs the water molecules in the adhesive composition and penetrates through fiber cords whereby the penetration of the adhesive matrix component comprising an epoxy compound, isocyanate compound, rubber latex, etc., into the depths of fiber cords is retarded. Therefore, when the fiber cords to which the adhesive compositions has been applied are subjected to a heat treatment, the adhesive matrix component is solidified on the surface layer of each fiber cord, while the silicate compound is substantially left in the depths of the fiber cord. As a result, the degrees of freedom of the individual yarns in the depths of the cord are enlarged, the softness of the fiber cords is improved, and the high strength of the fiber cords themselves is maintained.

In addition, the adhesive matrix component, particularly when it is rubber latex, avoids coagulation from the addition of the silicate compound to the composition, and therefore the adhesive matrix component is uniformly mixed and stabilized in the composition and can adhere uniformly onto the surfaces of the fibers with high coagulating strength. For these reasons, the fibers coated with even a small amount of the adhesive composition of the present invention exhibit excellent adhesiveness to rubber.

The silicate compound is incorporated into a treating liquid with a one-bath adhesive formulation (hereinafter referred to as treating liquid A) or into a treating liquid with a two-bath adhesive formulation (hereinafter referred to as treating liquid B).

The treating liquid A with a one-bath adhesive formulation is an adhesive composition where the adhesive matrix component consists essentially of a resorcinol-formaldehyde-rubber latex, and is applied to synthetic fiber cords in one step.

The resorcinol-formaldehyde-rubber latex is a mixture comprising a precondensate of resorcinol-formaldehyde and a rubber latex and is generally referred to as RFL.

The precondensate of resorcinol and formalin in the RFL is obtained in the presence of an alkaline catalyst, and it is preferable that the molar ratio of resorcinol to formalin is from about 1/0.3 to 1/3.0, more preferably from about 1/0.75 to 1/1.50.

It is preferable that the RFL is a mixture of a precondensate obtained by the reaction of a compound of the following general formula (I) and formalin at a weight ratio of from about 1/10 to 10/10 in the presence of an alkaline catalyst, with a rubber latex mixture obtained by mixing a rubber latex and aqueous ammonia at a weight ratio of from about 10/0.1 to 20/1, at a weight ratio of from about 1/8 to 1/4 in terms of the solid contents.

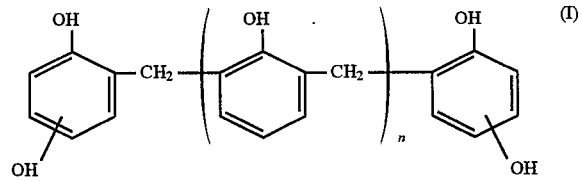

wherein n represents 0 or an integer from 1 to 15.

As the compound of formula (I), a novolak-type resin obtained by reacting dihydroxybenzene and formaldehyde in the absence of a catalyst or presence of an acidic catalyst may be used. Specifically, a condensate is obtained by condensing one mol of resorcinol and 0.70 mols of formaldehyde (for example, Sumikanol-700 (trade name) produced by Sumitomo Chemical).

Where the novolak-type condensate of resorcinol and formalin is used in the RFL, it is preferable that the condensate be dissolved in an aqueous dispersion of an alkaline catalyst, to which formalin is added, so as to have the same molar ratio as that of the resorcinol-formalin precondensate.

The rubber latex used in the RFL may be a natural rubber latex, a styrene-butadiene rubber latex, an acrylonitrile-butadiene rubber latex, a chloroprene rubber latex, a vinylpyridine-styrene-butadiene rubber latex, etc. These can be used either singly or as mixtures. In particular, when a vinylpyridine-styrene-butadiene latex is used along with other rubber latexes, it is preferable that the ratio of the vinylpyridine-styrenebutadiene latex to the other rubber latexes is about 70% by weight or less.

It is preferable that the treating liquid A is used as a solution or dispersion having a total solid concentration of the adhesive matrix component of from about 5 to 20%, more preferably from about 8 to 16%. The treating liquid A is preferably applied to polyamide fibers and polyester fibers, particularly high-strength nylon 66 fiber cords.

The treating liquid B with a two-bath adhesive formulation is an adhesive composition where the adhesive matrix component consists essentially of at least one compound selected from polyepoxide compound, blocked polyisocyanate compounds and ethylene-urea compounds. Treating liquid B is applied to synthetic fiber cords, which are thereafter treated with a second treating liquid comprising RFL as the essential adhesive matrix component (hereinafter referred to as treating liquid C).

The polyepoxide compound suitable for liquid B is a compound having two or more epoxy groups in one molecule and includes, for example, reaction products of polyalcohols, such as glycerol, pentaerythritol, sorbitol, ethylene glycol, polyethylene glycol, propylene glycol, polypropylene glycol, etc., and halogen-containing epoxides such as epichlorohydrine, etc.; reaction products of polyphenols, such as resorcinol, bis(4-hydroxyphenyl)dimethylmethane, phenol-formaldehyde resins, resorcinol-formaldehyde resins, etc., and halogen-containing epoxides such as those mentioned above; and polyepoxide compounds obtained by oxidizing the unsaturated bond part of bis-(3,4-epoxy-6-methyl-dicyclohexylmethyl)adipate,3,4-epoxycyclohexene-epoxide, etc.

Of these polyepoxide compounds, preferred are reaction products of polyalcohols and epichlorohydrine (polyglycidyl ether compounds of polyalcohols).

The blocked polyisocyanate compound suitable for treating liquid B is a compound capable of releasing the blocking agent under heat to give an active isocyanate compound and includes, for example, reaction products of polyisocyanate compounds such as tolylene diisocyanate, metaphenylene diisocyanate, diphenylmethane diisocyanate, hexamethylene diisocyanate, triphenylmethane triisocyanate, etc., and a blocking agent selected from phenols such as phenol, cresol, resorcinol, etc., lactams such as ε-caprolactam, valerolactam, etc., oximes such as acetoxime, methyl, ethyl ketone oxime, cyclohexane oxime, etc., ethyleneimine, etc.

Of these blocked polyisocyanate compounds, preferred are ε-caprolactam-blocked aromatic polyisocyanate compounds.

The ethylene-urea compound suitable for treating liquid B is such that the ethyleneimine ring in the compound is cleaved under heat and the thus-cleaved product acts to improve the adhesiveness of the fibers coated with the adhesive composition. As typical examples of the compound, mentioned are reaction products of aromatic or aliphatic isocyanates such as hexamethylene diisocyanate, tolylene diisocyanate, diphenylmethane diisocyanate, triphenylmethane triisocyanate, etc., and ethyleneimine, etc.

Of these ethylene-urea compounds, preferred are aromatic ethylene-urea compounds such as diphenylmethane-diethylene-urea.

Treating liquid B may contain the blocked polyisocyanate compounds and/or the ethylene-urea compounds.

The choice of a rubber latex as an optional component in treating liquid B depends on the rubber to be reinforced by the fibers coated with the adhesive composition and includes, for example, vinylpyridine-styrene-butadiene copolymer latexes, styrene-butadiene-type rubber latexes, acrylonitrile-butadiene-type rubber latexes, chloroprene-type rubber latexes, chlorosulfonated polyethylene latexes, acrylate-type rubber latexes, natural rubber latexes, etc.

The proportions of the polyepoxide compound, the blocked polyisocyanate compound and/or ethylene-urea compound (considered as one weight component), and the rubber latex which are in the treating liquid B are preferably from about 10 to 25% by weight, from about 20 to 35% by weight and from about 0 to 70% by weight, respectively, more preferably from about 10 to 20% by weight, from about 20 to 30% by weight and from about 0 to 70% by weight, respectively.

If the proportions of the polyepoxide compound and the blocked polyisocyanate compound and/or ethylene-urea compound are smaller than those falling within the above-mentioned ranges, the initial adhesive strength of the synthetic fibers treated with the adhesive composition is lowered.

It is preferable that the treating liquid B is used as a solution or dispersion having a total solid concentration of the adhesive matrix component of from about 2 to 10%, preferably from about 4 to 7%. Treating liquid B is preferably applied to polyester fibers and aromatic polyamide fibers of synthetic fibers.

Treating liquid C (second treating liquid) that is applied to the synthetic fibers treated with treating liquid B preferably comprises a mixture of RFL and an ethylene-urea compound. The rubber latex in the RFL may be, for example, vinylpyridine-styrene-butadiene copolymer latexes, styrene-butadiene-type rubber latexes, acrylonitrile-butadiene-type rubber latexes, chloroprene-type rubber latexes, chlorosulfonated polyethylene latexes, acrylate-type rubber latexes, natural rubber latexes, etc.

The ethylene-urea compound in the treating liquid C may be, for example, reaction products of aromatic or aliphatic isocyanates such as hexamethylene diisocyanate, tolylene diisocyanate, diphenylmethane diisocyanate, triphenylmethane triisocynante, etc., and ethyleneimine, like in the treating liquid B.

The amount of the ethylene-urea compound added to the treating liquid C in order to improve the adhesiveness of the adhesive composition is preferably from about 3 to 30% by weight, especially preferably from about 10 to 20% by weight, relative to RFL. If the amount of the ethylene-urea compound in treating liquid C is smaller than about 3% by weight, the effect of the compound of improving the adhesiveness of the adhesive composition is unsatisfactory. However, even if the ethylene-urea compound is added in an amount larger than about 30% by weight, no further improvement in the adhesiveness of the adhesive composition is realized, and the addition of such a large amount of the ethylene-urea compound can produce negative effects such as a reduction in the mechanical strength of the cured fibers.

It is preferable that treating liquid C is used as a solution or dispersion having a total solid concentration in the adhesive matrix component of from about 5 to 20%, preferably from about 7 to 15%.

The silicate compound is added to the treating liquid A or B in an amount from about 1 to 15% by weight relative to the adhesive matrix component in the liquid. Preferably, the amount of the silicate compound added to the treating liquid A is from about 2.0 to 5.0% by weight, whereas the amount added to treating liquid B is from about 3 to 10% by weight. If the amount of the silicate compound in the treating liquid is smaller than about 1.0% by weight, reduction in the mechanical strength of the fiber cords treated with the liquid will not be prevented. If, however, the quantity of the silicate compound is larger than about 15.0% by weight, the adhesiveness of the treated fiber cords to rubber is often lowered.

The rubber-reinforcing synthetic fibers of the present invention will now be described.

The rubber-reinforcing synthetic fibers as referred to herein may be in the form of filament yarns, cords, woven structures, woven fabrics, etc. comprising synthetic fibers, such as polyamide fibers, polyester fibers, aromatic polyamide fibers, polyvinyl alcohol fibers, etc., and are characterized in that their surfaces have been coated with the above-mentioned adhesive composition. Preferred are cords of such fibers having both a primary twist and a final twist in the opposite direction at a twist coefficient of from about 1500 to 2300, more preferably from 1600 to 2000.

The polyester fibers are preferably made from polyethylene terephthalate or a high-molecular linear polyester consisting essentially of ethylene terephthalate units.

The polyamide fibers are preferably made from nylon 6 or nylon 66. Preferred are ultra-high-strength nylon 66 cords made of fibers of high-molecular nylon 66 having a relative viscosity (relative to sulfuric acid) of about 3.0 or more, more preferably about 3.5 or more, and containing an antioxidant comprising a copper compound by which the durability of the cords against the deterioration by heat, light and oxygen is improved.

The aromatic polyamide fibers are preferably made from poly-p-phenyleneterephthalamide, poly-p-phenylene-3,4'-diphenyleter-terephthalamide, and copolymers consisting essentially of these.

The polyvinyl alcohol fibers are preferably made of polyvinyl alcohol having a degree of polymerization of about 500 or more, more preferably about 2000 or more.

The rubber-reinforcing synthetic fibers of the present invention can be produced by treating synthetic fibers with the above-mentioned one-bath or two-bath treating liquid comprising the adhesive composition of the invention.

The one-bath adhesive formulation mentioned above is preferably applied to polyamide fibers, polyester fibers and polyvinyl alcohol fibers, more preferably to ultra-high-strength nylon 66 fibers. These fibers are processed into rubber-reinforcing synthetic fibers: an example of such a process will be described below.

Non-treated fiber cords are directly, or after having been woven into cord fabrics, fed to a dipping step where the treating liquid A mentioned above is applied to the non-treated fiber cords or cord fabrics.

The treating liquid A is applied to the non-treated fiber cords by any conventional dipping, coating and spraying method, and it is preferable that the cord tension maintained during the process is from about 0.05 to 0.20 g/d.

It is preferable that the quantity of treating liquid A to be adhered to polyamide fiber cords is from about 2.0 to 5.0% by weight, more preferably from about 2.5 to 4.0% by weight, in terms of the solid content in the liquid, and that the quantity of treating liquid A to polyvinyl alcohol fiber cords is from about 2.0 to 5.0% by weight, especially preferably from about 2.5 to 4.0% by weight. The amount of treating liquid A adhered to the fiber cords can be controlled by varying the concentration of the dipping liquid, the amount of the silicate compound in the liquid A, and the conditions for wiping the dipped cords.

After treating liquid A has been applied to the fiber cords, the thus-dipped cord are dried at 100° to 160° C. for 60 to 120 seconds, and then heat-treated under tension at 210° to 250° C. for 30 to 60 seconds in a hot-stretching zone. The cord tension during the process is such that the intermediate elongation and the thermal shrinkage of the cord matches have predetermined values. It is desirable that the conditions for the thermal relaxation treatment and the time for the treatment in the next normalizing zone are the same as those in the previous hot-stretching zone.

The two-bath adhesive formulation mentioned above is applied to polyester fibers and aromatic polyamide fibers. These fibers can be processed into rubber-reinforcing synthetic fibers. An example of such a process is described below.

First, treating liquid B is applied to fiber cords, which are then dried at 70° to 150° C. and thereafter heat-treated at 200° to 255° C.

Next, treating liquid C is applied to the fiber cords, which are again dried at 70° to 150° C. and thereafter heat-treated at 200° to 255° C.

The amount of treating liquid B adhered to the synthetic fiber cords is preferably from about 1.0 to 2.0% by weight, more preferably from about 1.2 to 1.7% by weight, in terms of the solid content of the liquid, for polyester fibers; and is preferably from about 1.0 to 3.0% by weight, more preferably from about 1.2 to 2.0% by weight for aromatic polyamide fibers.

The thus-obtained rubber-reinforcing synthetic fibers of the present invention have a cord hardness of from about 5 to 20 g/cord and have a drawing T-adhesive strength of one cord of from about 5.5 to 7.5 g/d. Even though the amount of the adhesive composition adhered to the fibers is small, the adhesiveness of the fibers to rubber is extremely high.

Therefore, the rubber-reinforcing synthetic fibers of the present invention can be formed into soft and high-grade cords having excellent adhesiveness (drawing strength) to rubber and having excellent fatigue resistance. The cords are useful as reinforcing materials for rubber products such as tires, belts, hoses, etc.

In particular, the dipped polyamide fiber cords have a high mechanical strength and have high adhesiveness to rubber and, in addition, the high mechanical strength of the cords is well maintained even after the cords are combined with rubber and subjected to vulcanization. Therefore, the dipped polyamide fiber cords may be formed into high-strength vulcanized cords. Where the high-strength vulcanized cords are used as reinforcing materials for tires, the number of the cords in one tire may be advantageously reduced. Where these are woven into cord fabrics, the number of the plies in one cord fabric may be advantageously reduced.

Since the fiber cords treated with the adhesive composition of the present invention may have a reduced fineness (size), the fiber cords treated with the adhesive composition can have a reduced weight without lowering their rubber-reinforcing function. Therefore, the rubber-reinforcing fiber cords of the present invention enable the realization of lightweight fiber-reinforced rubber structures.

The fiber-reinforced rubber structures of the present invention are characterized in that the rubber in rubber structures have been reinforced by the rubber-reinforcing synthetic fibers mentioned above. These structures exhibit high-grade characteristics such as being soft and having improved adhesiveness (drawing strength) between the fibers and rubber therein and improved fatigue resistance. Therefore, these fiber-reinforced rubber structures are extremely useful as tires, belts, hoses, etc.

The present invention is described in more detail by means of the following examples, which, however, are not intended to restrict the scope of the present invention defined in the appended claims. In the following examples and comparative examples, the data of the samples were obtained according to the methods mentioned below.

(1) T-adhesive Strength

According to the adhesive strength-A method of JIS L-1017 (1983), a treated cord is embedded in non-vulcanized rubber and subjected to pressure vulcanization at 150° C. for 30 minutes. After cooling, the cord is drawn out of the rubber block at a speed of 30 cm/min, whereupon the drawing load per cm is divided by the fineness of the cord. The thus-obtained value is represented in the units g/d. The fineness is measured according to JIS L-1017 (1983). For polyester fiber cords and polyamide fiber cords, the fineness is based on the corrected weight, which is referred to as a conditioned fineness (size). For aromatic polyamide fiber cords, the fineness is based on the bone dry weight, which is referred to as an absolute dry fineness (size).

(2) Cord Hardness

A treated cord is straightened and cut into 2 cm lengths. A cut cord is put on the bridge of a Tensilon tensile tester (1 cm distance; $\phi=0.6$ mm), and a hook bar ($\phi=0.6$ mm) which is perpendicular to the cord is applied to the center of the cord and pulled down at a speed of 2 cm/min, whereupon the maximum stress value is obtained. The thus-obtained value is referred to as the cord hardness.

(3) Fatigue Resistance (in terms of disc fatigue by the Goodrich method)

According to JIS L-1017 (1983), a rubber block having polyester fibers embedded therein is fixed around two discs, which are inclined to have a degree of elongation of 5% and a degree of compression of 20%. Under this condition, the rubber block is repeatedly fatigued at 1705 rpm for 48 hours. After this, the percentage (%) strength retention of the rubber block is measured. The rubber compound used is a non-vulcanized rubber for ordinary carcass consisting essentially of natural rubber.

(4) Amount of Resin Adhered

The amount of the resin adhered to polyester fibers, polyamide fibers, aromatic polyamide fibers or polyvinyl alcohol fibers is obtained according to the weight method of JIS 1-1017 (1983).

The constitutive elements, the transmittance (T), the thixotropy index and the specific surface area of each of eight silicate compounds used in the following examples and comparative examples are shown below. Samples A to D are synthetic smectites satisfying the conditions of the present invention, and Samples E to H are natural silicate compounds outside of the scope of the invention.

TABLE 1

| | Chemical Compositions of Silicate Compounds (wt. %) | | | | | | | |
|---|---|---|---|---|---|---|---|---|
| | Examples (synthetic smectites) | | | | Comparative Examples (natural silicates) | | | |
| Samples | A | B | C | D | E | F | G | H |
| Components | | | | | | | | |
| SiO$_2$ | 54.5 | 54.5 | 56.1 | 59.5 | 65.0 | 70.82 | 80.93 | 91.01 |
| (Si content) | (25.5) | (25.5) | (26.2) | (27.8) | (30.4) | (33.1) | (37.8) | (42.5) |
| Al$_2$O$_3$ | 0.19 | 0.19 | — | — | 16.0 | 21.94 | 14.76 | 5.82 |
| (Al content) | (0.10) | (0.10) | — | — | (8.5) | (11.6) | (7.81) | (3.03) |
| Fe$_2$O$_3$ | — | — | — | — | 3.5 | 0.17 | 0.13 | 0.48 |
| (Fe content) | — | — | — | — | (2.4) | (0.12) | (0.09) | (0.33) |
| CaO | — | — | — | — | 3.5 | 0.02 | 0.02 | 0.02 |
| (Ca content) | — | — | — | — | (2.5) | (0.01) | (0.01) | (0.01) |
| MgO | 27.2 | 27.9 | 26.6 | 27.3 | 2.5 | 0.01 | 0.01 | 0.04 |
| (Mg content) | (16.4) | (16.8) | (16.0) | (16.5) | (1.5) | (0.006) | (0.006) | (0.02) |
| K$_2$O | — | — | — | — | 1.5 | 0.92 | 0.98 | 0.92 |
| (K content) | — | — | — | — | (1.2) | (0.76) | (0.81) | (0.76) |
| Na$_2$O | 5.8 | 2.7 | 3.6 | 3.8 | 2.0 | 0.18 | 0.91 | 0.18 |
| (Na content) | (4.3) | (2.0) | (2.7) | (2.8) | (1.5) | (0.13) | (0.14) | (0.43) |
| Li$_2$O | 1.1 | 1.1 | 1.4 | 0.8 | — | — | — | — |
| (Li content) | (0.59) | (0.5) | (0.6) | (0.4) | — | — | — | — |
| TiO$_2$ | — | — | — | — | — | 0.49 | 0.15 | 0.27 |
| (Ti content) | — | — | — | — | — | (0.29) | (0.09) | (0.18) |
| F | 2.9 | — | 5.6 | — | — | — | — | — |
| Ig-loss | 8.3 | 13.8 | 6.7 | 8.6 | 6.0 | 5.51 | 2.83 | 1.53 |
| Transmittance (%) | 95 | 95 | 95 | 95 | 0.1 | Precipitated and separated | Precipitated and separated | Precipitated and separated |
| Specific Surface Area (m$^2$/g) | 180 | 170 | 170 | 170 | 35 | 27 | 20 | 17 |
| Thixotropy Index Viscosity (as 2% aqueous dispersion, c.p.s.) | 8.9 | 7.8 | 3.0 | 6.5 | Unmeasurable due to precipitation and separation | Unmeasurable due to precipitation and separation | Unmeasurable due to precipitation and separation | Unmeasurable due to precipitation and separation |
| 6 rpm | 7,100 | 4,500 | 360 | 4,500 | | | | |
| 60 rpm | 800 | 580 | 120 | 720 | | | | |

EXAMPLES 1 TO 7, COMPARATIVE EXAMPLES 1 TO 5

A 2 wt % aqueous dispersion of each of the above-mentioned silicate compounds A to D was added to a 5.5% liquid of a mixture obtained by mixing polyepoxide compound/blocked isocyanate compound/rubber latex at a ratio, in terms of the solid contents, of 11.0 wt %/23.0 wt %/66.0 wt %, the proportion of the aqueous dispersion added being indicated in Table 2 below. Thus, seven first treating liquids (Examples 1 to 7) were prepared. The stability of these first treating liquids is shown in Table 2.

14.3 parts by weight of resorcinol/formalin (R/F) precondensate (RF resin) obtained by ripening R/F for 4 hours, at a molar ratio of 1/1.5 and at a solid concentration of 10% by weight, in the presence of an ordinary alkaline catalyst were added to 100 parts by weight of vinylpyridine/styrene/butadiene copolymer latex (VP latex) and ripened for 24 hours to prepare RFL having a solid concentration of 20% by weight. 10 parts by weight of an aqueous dispersion of diphenylmethane-bis-4,4'-N,N'-diethylene-urea were added to 100 parts of the RFL to prepare a second treating liquid having a solid concentration of 12% by weight.

For comparison, five first treating liquids (Comparative Examples 1 to 5) were prepared in the same manner as above, except that a 2 wt % aqueous dispersion of each of the above-mentioned silicate compounds E to H was added in place of the aqueous dispersions of compounds A to D, at the proportion indicated in Table 3, or no silicate compound was added. The stability of these first treating liquids is shown in Table 3.

On the other hand, polyethylene terephthalate having a yarn viscosity of 0.95 was melt-spun and stretched to give multi-filaments of 1500 deniers. These were twisted 40 times/10 cm (for primary twist). Two of the thus-twisted cords were further twisted at the same count as that of the primary twist but in the opposite direction (for final twist) to obtain a raw cord.

Next, using a computreater single dipping machine (produced by C. A. Litelar, USA), the first treating liquid having the composition shown in Tables 2 and 3 was applied to the raw cord, and the thus-treated cord was wiped with an air wiper under pressure of 0.15 kg/cm$^2$, then passed through the drying zone at 120° C. at a constant speed for 100 seconds and thereafter heat-treated in the hot-stretching zone under tension of 0.8 g/d at 240° C. for 30 seconds.

Next, the second treating liquid was applied to the polyester cord that had been treated with the first treating liquid, and then the cord was wiped with an air wiper under pressure of 0.30 kg/cm$^2$, then passed through the drying zone at 100° C. at a constant speed for 100 seconds, thereafter heat-treated in the hot-stretching zone under tension of 0.7 g/d at 240° C. for 30 seconds, and further heat-treated in the normalizing zone at 240° C. for 30 seconds while relaxing the cord by 2.0%.

The thus-treated cords were evaluated in terms of their characteristics, and the results are shown in Tables 2 and 3.

TABLE 2

|  | Examples | | | | | | |
| --- | --- | --- | --- | --- | --- | --- | --- |
|  | 1 | 2 | 3 | 4 | 5 | 6 | 7 |
| Silicate Compound | A | A | A | A | B | C | D |
| Condition of Aqueous Dispersion of Silicate Compound | Viscosity Increased | Viscosity Increased | Viscosity Increased | Viscosity Increased | Viscosity Increased | Viscosity Increased | Viscosity Increased |
| Amount of Aqueous Dispersion of Silicate Compound Added | 5.5 | 11.0 | 19.0 | 27.5 | 11.0 | 11.0 | 11.0 |
| Stability of First Treating Liquid | Good | Good | Good | Good | Good | Good | Good |
| T-Adhesive Strength (g/d) | 7.3 | 7.0 | 6.8 | 6.0 | 6.6 | 6.5 | 5.9 |
| Cord Hardness (g/cord) | 15.0 | 12.2 | 10.6 | 7.3 | 11.8 | 10.9 | 11.0 |
| Percentage of Retention of Strength after GD Fatigue Test (%) | 95 | 95 | 96 | 98 | 96 | 95 | 94 |
| Amount of Resin Adhered (%) | 3.5 | 2.8 | 2.3 | 2.1 | 2.4 | 2.2 | 2.1 |

TABLE 3

|  | Comparative Examples | | | | |
| --- | --- | --- | --- | --- | --- |
|  | 1 | 2 | 3 | 4 | 5 |
| Silicate Compound | E | F | G | H | — |
| Condition of Aqueous Dispersion of Silicate Compound | Precipitated and separated | Precipitated and separated | Precipitated and separated | Precipitated and separated | — |
| Amount of Aqueous Dispersion of Silicate Compound Added | 11.0 | 11.0 | 11.0 | 11.0 | 0 |
| Stability of First Treating Liquid | Bad | Bad | Bad | Bad | Good |
| T-Adhesive Strength (g/d) | 4.2 | 3.6 | 4.0 | 3.5 | 6.5 |
| Cord Hardness (g/cord) | 19.5 | 18.9 | 20.3 | 20.8 | 40.3 |
| Percentage of Retention of Strength after GD Fatigue Test (%) | 88 | 83 | 85 | 82 | 75 |
| Amount of Resin Adhered (%) | 2.1 | 2.2 | 2.4 | 2.3 | 2.5 |

EXAMPLES 8 TO 14, COMPARATIVE EXAMPLES 6 TO 10

12.5 parts by weight of resorcinol/formalin (R/F) precondensate (RF resin) obtained by ripening R/F for 2 hours, at a molar ratio of 1/1.5 and at a solid concentration of 10% by weight, in the presence of an ordinary alkaline catalyst, was added to 100 parts by weight of vinylpyridine/styrene/butadiene copolymer latex (VP latex) and ripened for 24 hours to prepare RFL having a solid concentration of 30% by weight. 25% by weight of an absorption-type adhesive, Denabond (produced by Nagase Chemical) or Sumikanol 750 (produced by Sumitomo Chemical) were added to 100 parts of the RFL, water was added thereto to achieve a solid concentration of 14% by weight, and the resulting mixture was ripened for 24 hours. Next, a 2 wt % aqueous dispersion of each of the above-mentioned silicate compounds A to D was added to the mixture at the proportion indicated in Table 4. Thus, seven treating liquids were prepared (Examples 8 to 14). The stability of these treating liquids is shown in Table 4.

For comparison, five other treating liquids (Comparative Examples 6 to 10) were prepared in the same manner as above, except that a 2 wt % aqueous dispersion of silicate compounds E was added in place of the aqueous dispersions of compounds A to D, at the proportion indicated in Table 5, or no silicate compound was added. The amount of the absorption-type adhesive added is shown in Table 5. The stability of these treating liquids is also shown in Table 5.

Additionally, polyethylene terephthalate having a yarn viscosity of 0.95 was melt-spun and stretched to produce multi-filaments of 1500 deniers. These were twisted to 40 times/10 cm (as a primary twist). Two of the thus-twisted cords were further twisted at the same count as that of the primary twist but in the opposite direction (as a final twist) to obtain a raw cord.

Next, using a computreater single dipping machine (produced by Litzlar, USA), the treating liquid having the composition shown in Tables 4 and 5 was applied to the raw cord, and the thus-treated cord was wiped with an air wiper under pressure of 0.35 kg/cm$^2$, then passed through the drying zone at 130° C. at a constant speed for 100 seconds, thereafter heat-treated in the hot-stretching zone under tension of 0.8 g/d at 250° C. for 30 seconds and further heat-treated in the normalizing zone at 250° C. for 30 seconds while relaxing the cord by 1.5%.

Various characteristics of the thus-treated cords were evaluated, and the results are shown in Tables 4 and 5.

TABLE 4

|  | Examples | | | | | | |
| --- | --- | --- | --- | --- | --- | --- | --- |
|  | 8 | 9 | 10 | 11 | 12 | 13 | 14 |
| Silicate Compound | A | A | A | B | C | D | D |
| Condition of Aqueous Dispersion of Silicate Compound | Viscosity Increased | Viscosity Increased | Viscosity Increased | Viscosity Increased | Viscosity Increased | Viscosity Increased | Viscosity Increased |
| Amount of Aqueous Dispersion of Silicate Compound Added | 10.0 | 20.0 | 15.0 | 15.0 | 15.0 | 15.0 | 15.0 |
| Stability of First Treating Liquid | Good | Good | Good | Good | Good | Good | Good |
| Absorption-type Adhesive Added | Denabond | Denabond | S-750 | Denabond | Denabond | Denabond | S-750 |
| T-Adhesive Strength (g/d) | 6.9 | 6.3 | 6.0 | 6.5 | 6.3 | 6.0 | 6.0 |
| Cord Hardness (g/cord) | 13.0 | 8.3 | 9.5 | 10.2 | 9.8 | 10.9 | 10.3 |
| Percentage of Retention of Strength after GD Fatigue Test (%) | 95 | 98 | 97 | 98 | 96 | 95 | 95 |
| Amount of Resin Adhered (%) | 2.9 | 2.5 | 2.7 | 2.8 | 2.8 | 3.0 | 3.5 |

TABLE 5

|  | Comparative Examples | | | | |
| --- | --- | --- | --- | --- | --- |
|  | 6 | 7 | 8 | 9 | 10 |
| Silicate Compound | E | E | — | — | — |
| Condition of Aqueous Disperson of Silicate Compound | Precipitated and separated | Precipitated and separated | Precipitated and separated | — | — |
| Stability of Treating Liquid | Bad | Bad | Good | Good | Good |
| Absorption-type Adhesive Added | Denabond | S-75- | Denabond | S-750 | Denabond |
| Amount of Adhesive Added | 14.0 | 14.0 | 14.0 | 14.0 | 20.0 |
| T-Adhesive Strength (g/d) | 4.2 | 3.8 | 4.3 | 4.3 | 6.0 |
| Cord Hardness (g/cord) | 18.8 | 19.8 | 21.3 | 20.5 | 23.8 |
| Percentage of Retention of Strength after GD Fatigue Test (%) | 90 | 88 | 93 | 92 | 90 |
| Amount of Resin Adhered (%) | 3.0 | 3.2 | 3.0 | 6.5 | 6.5 |

EXAMPLES 15 TO 20, COMPARATIVE EXAMPLES 11 TO 13

Sumikanol 700 (produced by Sumitomo Chemical)/ formalin were mixed at a ratio by weight of 87/13 in the presence of an alkaline catalyst and ripened for 2 hours to obtain a precondensate having a solid concentration of 6.5% by weight.

On the other hand, 10 parts by weight of 28% aqueous ammonia was mixed with 100 parts by weight of a latex mixture obtained by mixing vinylpyridine/styrene/butadiene copolymer latex (VP latex) and styrene/butadiene copolymer latex (SBR latex) at a ratio by weight of 50/50 in terms of the solid contents.

Next, 18 parts by weight of the above-mentioned precondensate were mixed with 100 parts by weight of the above-mentioned latex mixture and ripened for 24 hours to prepare an RFL having a solid concentration of 14% by weight.

A 2 wt % aqueous dispersion of each of the above-mentioned silicate compounds A to D was added to 100% by weight of this RFL, at the proportion indicated in Table 6, to prepare six treating liquids (Examples 15 to 20). The stability of these treating liquids is shown in Table 6.

For comparison, a precondensate having a solid concentration of 10% by weight was obtained by mixing resorcinol/formalin at a molar ratio of 1/2 in the presence of an alkaline catalyst followed by ripening the mixture for 2 hours, then 18 parts by weight of this precondensate were mixed with 100 parts by weight of the same latex mixture described above and ripened for 24 hours to prepare RFL's having a solid concentration of 14% by weight and 20% by weight as shown in Table 7 (Comparative Examples 12 and 13).

Also for comparison, a 2 wt % aqueous dispersion of the above-mentioned silicate compound E was added to the RFL having a solid concentration of 14% by weight, at the proportion indicated in Table 7 (Comparative Example 11).

The stability of these comparative treating liquids is show in Table 7.

Additionally, nylon 66 having a yarn viscosity of 0.95 was melt-spun and stretched to give multi-filaments of 1260 deniers having a raw yarn strength of 11.2 g/d. These were twisted 39 times/10 cm (as a primary twist). Two of the thus-twisted cords were further twisted at the same count as that of the primary twist but in the opposite direction (as a final twist) to obtain a raw cord. This raw cord had a strength of 9.40 g/d.

Next, using a computreater single dipping machine (produced by Litzlar, USA), the treating liquid having the composition shown in Table 6 and 7 was applied to the raw cord, and the thus-treated cord was wiped with an air wiper under pressure of 0.30 kg/cm², then passed through the drying zone at 130° C. at a constant speed for 100 seconds, thereafter heat-treated in the hot-stretching zone under tension of 0.9 g/d at 230° C. for 50 seconds and further heat-treated in the normalizing zone at 225° C. for 50 seconds while relaxing the cord by 1.5%.

Various characteristics of the thus-treated cords were evaluated, and the result are shown in Tables 6 and 7.

TABLE 6

| | Examples | | | | | |
|---|---|---|---|---|---|---|
| | 15 | 16 | 17 | 18 | 19 | 20 |
| Silicate Compound | A | A | A | B | C | D |
| Condition of Aqueous Dispersion of Silicate Compound | Viscosity Increased | Viscosity Increased | Viscosity Increased | Viscosity Increased | Viscosity Increased | Viscosity Increased |
| Amount of Aqueous Dispersion of Silicate Compound Added | 10 | 15 | 20 | 15 | 15 | 15 |
| Stability of Treating Liquid | Good | Good | Good | Good | Good | Good |
| T-Adhesive Strength (g/d) | 7.1 | 5.9 | 6.1 | 5.8 | 6.7 | 5.9 |
| Cord Hardness (g/cord) | 17.4 | 10.5 | 9.5 | 10.2 | 13.8 | 11.3 |
| Percentage of Retention of Strength after GD Fatigue Test (%) | 88 | 90 | 91 | 89 | 92 | 89 |
| Cord Strength (g/d) | 10.0 | 10.5 | 10.13 | 10.08 | 10.20 | 10.10 |
| Strength after Vulcanization (g/d) | 9.50 | 9.60 | 9.55 | 9.45 | 9.61 | 9.53 |
| Amount of Resin Adhered (%) | 4.5 | 3.3 | 3.2 | 3.1 | 3.8 | 3.2 |

TABLE 7

| | Comparative Examples | | |
|---|---|---|---|
| | 11 | 12 | 13 |
| Silicate Compound | E | — | — |
| Condition of Aqueous Dispersion of Silicate Compound | Precipitated and separated | — | — |
| Amount of Aqueous Dispersion of Silica Compound Added | 15 | — | — |
| Stability of Treating Liquid | Bad | Good | Good |
| Concentration of Treating Liquid (%) | 14.0 | 14.0 | 20.0 |
| T-Adhesive Strength (g/d) | 5.3 | 5.7 | 5.9 |
| Cord Hardness (g/cord) | 16.5 | 22.3 | 29.8 |
| Percentage of Retention of Strength after GD Fatigue Test (%) | 78 | 78 | 70 |
| Cord Strength (g/d) | 9.80 | 9.30 | 8.80 |
| Strength after Vulcanization (g/d) | 9.00 | 8.35 | 8.00 |
| Amount of Resin Adhered (%) | 3.4 | 3.3 | 5.0 |

EXAMPLES 21 TO 25, COMPARATIVE EXAMPLES 14 AND 15

A 2 wt % aqueous dispersion of each of the above-mentioned silicate compounds A to D was added to a 5.5% liquid of a mixture obtained by mixing polyepoxide compound/blocked isocyanate compound/rubber latex at a ratio, in terms of the solid contents, of 11.0 wt %/23.0 wt %/66.0 wt %, the proportion of the aqueous dispersion added being indicated in Table 8 below. Thus, five first treating liquids (Examples 21 to 25) were prepared. The stability of these first treating liquids is shown in Table 8.

14.3 parts by weight of resorcinol/formalin (R/F) precondensate (RF resin) obtained by ripening R/F for 4 hours, at a molar ratio of 1/1.5 and at a solid concentration of 10% by weight, in the presence of an ordinary alkaline catalyst was added to 100 parts by weight of vinylpyridine/styrene/butadiene copolymer latex (VP latex) and ripened for 24 hours to prepare RFL having a solid concentration of 20% by weight. 10 parts by weight of an aqueous dispersion of diphenylmethane-bis-4,4'-N,N'-diethylene-urea were added to 100 parts of the RFL to prepare a second treating liquid having a solid concentration of 12% by weight.

For comparison, two first treating liquids (Comparative Examples 14 and 15) were prepared in the same manner as above, except that a 2 wt % aqueous dispersion of the above-mentioned silicate compound E was added in place of the aqueous dispersions of compounds A to D, at a proportion of 15% by weight, or no silicate compound was added. The stability of these first treating liquids is shown in Table 8.

Additionally, aromatic polyamide filament yarns having a nominal fineness of 1500 deniers and comprising 1000 filaments (Kevlar, produced by DuPont) were twisted 35 times/10 cm (as a primary twist). Two of the thus-twisted cords were further twisted at the same count as that of the primary twist but in the opposite direction (as a final twist) to obtain a raw cord. The strength of this raw cord was 17.5 g/d.

Next, using a computreater single dipping machine (produced by Litzlar, USA), the first treating liquid having the composition shown in Table 8 was applied to the raw cord, and the thus-treated cord was wiped with an air wiper under pressure of 0.10 kg/cm², then passed through the drying zone at 130° C. at a constant speed for 150 seconds, and thereafter heat-treated in the hot-stretching zone under tension of 0.5 g/d at 240° C. for 60 seconds.

Next, the second treating liquid was applied to the aromatic polyamide cord that had been treated with the first treating liquid, and then the cord was passed through the drying zone at 100° C. at a constant speed for 150 seconds, thereafter heat-treated in the hot-stretching zone under tension of 0.25 g/d at 230° C. for 60 seconds, and further heat-treated in the normalizing zone at 23.0° C. for 30 seconds.

Various characteristics of the thus-treated cords were evaluated in terms of their characteristics, and the results are shown in Table 8.

TABLE 8

|  | Examples | | | | | Comparative Examples | |
| --- | --- | --- | --- | --- | --- | --- | --- |
|  | 21 | 22 | 23 | 24 | 25 | 14 | 15 |
| Silicate Compound | A | A | B | C | D | E | — |
| Condition of Aqueous Dispersion of Silicate Compound | Viscosity Increased | Viscosity Increased | Viscosity Increased | Viscosity Increased | Viscosity Increased | Precipitated and separated | — |
| Amount of Aqueous Dispersion of Silicate Compound Added | 10 | 20 | 15 | 15 | 15 | 15 | 0 |
| Stability of First Treating Liquid | Good | Good | Good | Good | Good | Bad | Good |
| T-Adhesive Strength (g/d) | 7.2 | 6.9 | 6.5 | 6.4 | 5.7 | 4.0 | 6.3 |
| Cord Hardness (g/cord) | 17.4 | 7.8 | 10.5 | 10.2 | 10.6 | 18.8 | 36.1 |
| Percentage of Retention of Strength after GD Fatigue Test (%) | 88 | 97 | 93 | 97 | 95 | 87 | 72 |
| Amount of Resin Adhered (%) | 5.1 | 3.6 | 4.0 | 4.3 | 4.0 | 4.0 | 3.8 |

EXAMPLES 26 TO 31, COMPARATIVE EXAMPLES 16 AND 17

A resorcinol/formalin (R/F) precondensate (RF resin) was obtained by ripening R/F for 6 hours, at a molar ratio of 1/2 and at a solid concentration of 10% by weight, in the presence of an alkaline catalyst. 17 parts by weight of this RF resin were mixed with 100 parts by weight of a latex mixture prepared by mixing vinylpyridine/styrene/butadiene copolymer latex (VP latex) and low-molecular styrene/butadiene copolymer latex (SBR latex) at a ratio by weight of 7/3 in terms of the solid contents, the water was added thereto to produce a resulting mixture having a solid concentration of 14% by weight (RFL). This RFL was ripened for 24 hours.

To 100 parts by weight of the thus-obtained RFL, there was added any of the above-mentioned silicate compounds (2% by weight) at the proportion indicated in Table 9 (Examples 26 to 30).

For comparison, two other treating liquids were prepared in the same manner as above, except that a 2 wt % aqueous solution of the above-mentioned silicate compound E was used in place of the silicate compounds A to D, or no silicate compound was added (Comparative Examples 16 and 17).

The stability of these treating liquids is shown in Table 9.

Additionally, a completely saponified polyvinyl alcohol having a degree of polymerization of 3500 and a degree of saponification of 99.5% or more was spun by alternate spinning and then stretched to produce multi-filaments of 1200 deniers comprising 750 filaments. These filaments were twisted 35 times/10 cm (as a primary twist). Two of the thus-twisted cords were further twisted at the same count as that of the primary twist but in the opposite direction (as a final twist) to obtain a raw cord.

Next, using a computreater single dipping machine (produced by Litzlar, USA), the above-mentioned treating liquid was applied to the raw cord, and the thus-treated cord was wiped with an air wiper under pressure of 0.3 kg/cm$^2$, then passed through the drying zone at 120° C. at a constant speed for 150 seconds, thereafter heat-treated in the hot-stretching zone under tension of 0.5% at 200° C. for 30 seconds, and further heat-treated in the normalizing zone at 200° C. for 30 seconds.

Various characteristics of the thus-treated cords were evaluated, and the results are shown in Table 9.

The same effects as above were obtained when a novolak-type RF, Sumikanol S-700 (produced by Sumitomo Chemical) was used in place of the above-mentioned RF resin (Example 31).

TABLE 9

|  | Examples | | | | | Comparative Examples | |
| --- | --- | --- | --- | --- | --- | --- | --- |
|  | 26 | 27 | 28 | 29 | 30 | 16 | 17 |
| Silicate Compound | A | A | B | C | D | E | — |
| Condition of Aqueous Dispersion of Silicate Compound | Viscosity Increased | Viscosity Increased | Viscosity Increased | Viscosity Increased | Viscosity Increased | Precipitated and separated | — |
| Amount of Aqueous Dispersion of Silicate Compound Added | 10 | 20 | 15 | 15 | 15 | 15 | 0 |
| Stability of Treating Liquid | Good | Good | Good | Good | Good | Bad | Good |
| T-Adhesive Strength (g/d) | 6.7 | 6.5 | 5.7 | 5.9 | 6.3 | 4.9 | 6.5 |
| Cord Hardness (g/cord) | 18.5 | 12.8 | 15.5 | 14.5 | 13.8 | 17.8 | 50.1 |
| Percentage of Retention of Strength after GD Fatigue Test (%) | 87 | 95 | 93 | 90 | 92 | 85 | 55 |
| Amount of Resin Adhered (%) | 4.7 | 3.2 | 3.9 | 4.3 | 4.0 | 4.4 | 8.0 |

As is obvious from the results in Tables 2 to 9, the rubber-reinforcing synthetic fibers treated with the adhesive composition of the present invention have well-balanced characteristics in terms of initial adhesive strength, cord hardness and strength retained after being fatigued. Therefore, by applying the fibers to a rubber matrix, it is possible to obtain high-grade fiber-reinforced rubber structures.

As has been described in detail herein, the adhesive composition of the present invention makes synthetic fibers highly adhesive to rubber even when a reduced amount of the composition is applied to the fibers. Therefore, the present invention enables the production of fiber-reinforced rubber structures at significantly reduced costs.

In addition, since the rubber-reinforcing synthetic fibers of the present invention have improved adhesiveness to rubber, and more particularly, improved adhesive strength (drawing strength) to rubber, while still possessing the desirable intrinsic characteristics of the synthetic fibers themselves, it is possible according to the present invention to obtain high-grade, fiber-reinforced rubber structures which are useful as tires, belts, hoses, etc.

While the invention has been described in detail and with reference to specific embodiments thereof, it will be apparent to one skilled in the art that various changes and modifications can be made therein without departing from the spirit and scope of the invention defined in the appended claims.

What is claimed is:

1. An adhesive composition for adhering rubber and synthetic fiber, said adhesive composition comprising an adhesive matrix and a silicate compound, wherein said silicate compound comprises silicon and magnesium at a ratio by weight of silicon/magnesium of from about 1/0.1 to 1/1.0, and wherein a 1% aqueous dispersion of said silicate compound has a transmittance of at least about 50% and/or a 2% aqueous dispersion of said silicate compound has a thixotropy index of about 2.0 to 10.0.

2. The adhesive composition according to claim 1, wherein said silicate compound further comprises sodium and lithium.

3. The adhesive composition according to claim 1 or claim 2, wherein said silicate compound is a smectite.

4. The adhesive composition according to claim 1 or claim 2, wherein said adhesive matrix component substantially consists of a resorcinol-formaldehyde-rubber latex.

5. The adhesive composition according to claim 1 or claim 2, wherein said adhesive matrix substantially consists of a mixture of a polyepoxide compound, a rubber latex, and a compound selected from the group consisting of a blocked isocyanate compound and an ethylene-urea compound.

6. The adhesive composition according to claim 1 or claim 2, wherein the quantity of said silicate compound in said adhesive composition is from 1 to 10% by weight relative to said adhesive matrix.

7. An aggregation of rubber-reinforcing synthetic fibers, said fibers being formed into an aggregation selected from the group consisting of yarn and cord, said fiber aggregation having fiber surfaces coated with an adhesive composition, said adhesive composition comprising a silicate compound and an adhesive matrix, said silicate compound comprising silicon and magnesium present at a ratio by weight of silicon/magnesium of from about 1/0.1 to 1/1.0, and wherein a 1% aqueous dispersion of said silicate compound has a transmittance of at least about 50% and/or a 2% aqueous dispersion of said silicate compound has a thixotropy index of about 2.0 to 10.0.

8. The aggregation of rubber-reinforcing synthetic fibers according to any one of claim 7, wherein the silicate compound is a smectite.

9. The aggregation of rubber-reinforcing synthetic fibers according to any one of claim 7, wherein said fiber aggregations are polyester fibers formed into cords, said cords being coated with said adhesive composition in an amount from about 2.0 to 4.0% by weight relative to the weight of said polyester fibers of said cords, said cords having a cord hardness from about 5 to 20 g/cord and a drawing T-adhesive strength per cord from about 5.5 to 7.5 g/d.

10. The aggregation of rubber-reinforcing synthetic fibers according to any one of claim 7, wherein said fiber aggregations are polyamide fibers formed into cords, said cords being coated with said adhesive composition in an amount from about 2.0 to 5.0% by weight relative to the weight of said polyamide fibers of said cords, said cords having a cord hardness from about 5 to 20 g/cord and a drawing T-adhesive strength per cord from about 5.5 to 7.5 g/d.

11. The aggregation of rubber-reinforcing synthetic fibers according to any one of claim 7, wherein said fiber aggregations are aromatic polyamide fibers formed into cords, said cords being coated with said adhesive composition in an amount from about 3.0 to 6.0% by weight relative to the weight of said aromatic polyamide fibers of said cords, said cords having a cord hardness from about 5 to 20 g/cord and a drawing T-adhesive strength per cord from about 5.5 to 7.5 g/d.

12. The aggregation of rubber-reinforcing synthetic fibers according to any one of claim 7, wherein said fiber aggregations are polyvinyl alcohol fibers formed into cords, said cords being coated with said adhesive composition in an amount from about 2.0 to 5.0% by weight relative to the weight of said polyvinyl alcohol fibers of said cords, said cords having a cord hardness from about 5 to 20 g/cord and a drawing T-adhesive strength per cord from about 5.5 to 7.5 g/d.

13. The aggregation of rubber-reinforcing synthetic fibers according to claim 9, wherein said cords have a primary twist and a final twist, wherein said final twist has a twist coefficient from about 900 to 1800, and said primary twist has a twist coefficient from about 1300 to 2500.

14. The aggregation of rubber-reinforcing synthetic fibers according to claim 10, wherein said cords have a primary twist and a final twist, wherein said final twist has a twist coefficient from about 900 to 1800, and said primary twist has a twist coefficient from about 1300 to 2500.

15. The aggregation of rubber-reinforcing synthetic fibers according to claim 11, wherein said cords have a primary twist and a final twist, wherein said final twist has a twist coefficient from about 900 to 1800, and said primary twist has a twist coefficient from about 1300 to 2500.

16. The aggregation of rubber-reinforcing synthetic fibers according to claim 12, wherein said cords have a primary twist and a final twist, wherein said final twist has a twist coefficient from about 900 to 1800, and said primary twist has a twist coefficient from about 1300 to 2500.

17. The aggregation of rubber-reinforcing synthetic fibers according to claim 13, wherein said cords have a primary twist and a final twist, wherein said final twist has a twist coefficient from about 900 to 1800, and said primary twist has a twist coefficient from about 1300 to 2500.

18. A fiber-reinforced rubber structure comprising a rubber matrix interspersed with a plurality of reinforcing fibers, wherein said rubber matrix is reinforced by and adhered to a plurality of rubber-reinforcing synthetic fibers in accordance with claim 9.

19. A fiber-reinforced rubber structure comprising a rubber matrix interspersed with a plurality of reinforcing fibers, wherein said rubber matrix is reinforced by and adhered to a plurality of rubber-reinforcing synthetic fibers in accordance with claim 10.

20. A fiber-reinforced rubber structure comprising a rubber matrix interspersed with a plurality of reinforcing fibers, wherein said rubber matrix is reinforced by and adhered to a plurality of rubber-reinforcing synthetic fibers in accordance with claim 11.

21. A fiber-reinforced rubber structure comprising a rubber matrix interspersed with a plurality of reinforcing fibers, wherein said rubber matrix is reinforced by and adhered to a plurality of rubber-reinforcing synthetic fibers in accordance with claim 12.

22. A fiber-reinforced rubber structure comprising a rubber matrix interspersed with a plurality of reinforcing fibers, wherein said rubber matrix is reinforced by and adhered to a plurality of rubber-reinforcing synthetic fibers formed into cords, said cords having characteristics as defined in accordance with claim 13.

* * * * *